April 23, 1957 P. J. BILY 2,789,843
SEALED SWIVEL JOINT
Original Filed Dec. 10, 1948

INVENTOR.
Peter J. Bily
BY
Attorney

United States Patent Office 2,789,843
Patented Apr. 23, 1957

2,789,843

SEALED SWIVEL JOINT

Peter J. Bily, Brea, Calif., assignor to Chiksan Company, Brea, Calif., a corporation of California Continuation of abandoned application Serial No. 64,493, December 10, 1948. This application July 24, 1953, Serial No. 370,098

1 Claim. (Cl. 285—276)

This invention has to do with a sealed swivel joint and is particularly concerned with a swivel joint for handling fluids and which involves a seal by which the sections of the joint are allowed limited freedom of movement and relative rotation while a fluid tight seal is maintained.

This application is filed as a continuation of application Serial Number 64,493, filed December 10, 1948, now abandoned, entitled Sealed Swivel Joint.

The present invention is intended primarily for incorporation in a simple compact structure connecting tubular parts for relative rotation, and the structure is such as to effectively operate under high temperatures and at substantial pressures. The joint of the present invention can be used in various situations. However, it is most advantageous in cases where intermittent service is required.

A general object of the present invention is to provide a sealing unit applicable to joint sections coupled for relative rotation, which unit has sealing engagement with the two sections and serves to effectively maintain a fluid tight joint or connection between the sections. The unitary sealing member or element provided by the present invention is simple and inexpensive of construction and is convenient and practical to handle.

It is another object of this invention to provide a sealing structure for swivel connections of the general character referred to which is applicable to swivelly connected sections without materially increasing the size of the joint structure either axially or radially and without impairing free flow of fluid through the structure from one end to the other thereof.

It is a further object of this invention to provide a sealing unit applicable to the sections of a joint of the general character referred to which unit is so engaged with the sections as to float or be movable relative to both sections as working conditions may require.

It is another object of the invention to provide a fluid handling joint with male and female sections rotatably coupled by means including axially spaced bearings and wherein a bellows type sealing means is located in the structure between the bearings and is effectively shielded from fluid handled by the joint.

Figure 1:
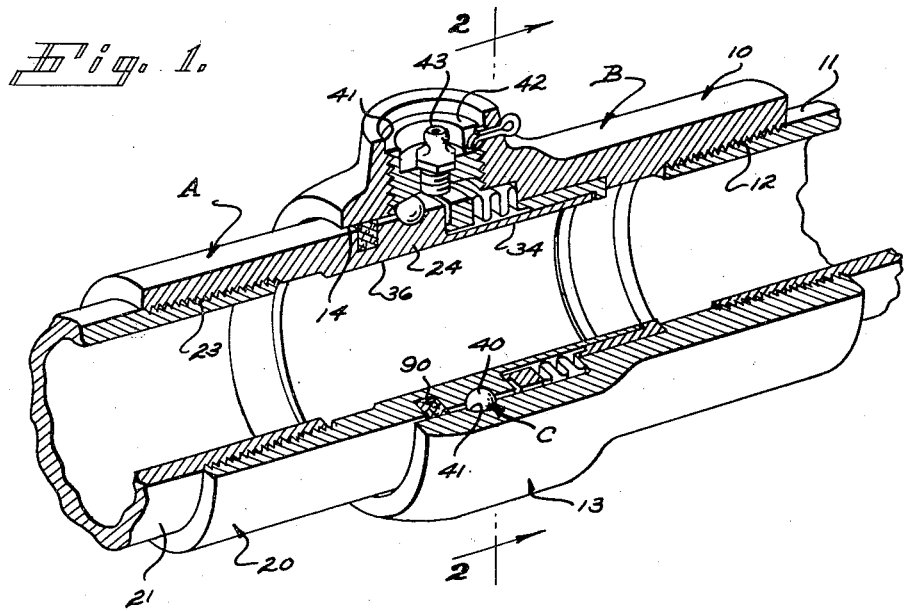
Figure 2:
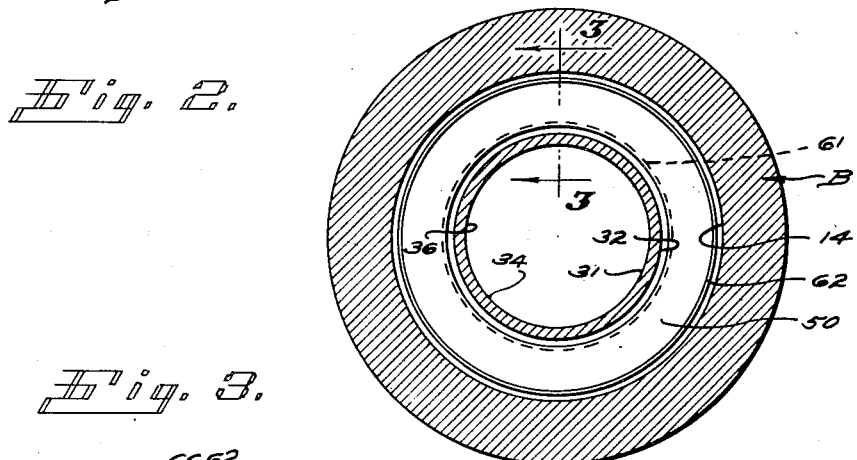
Figure 3:
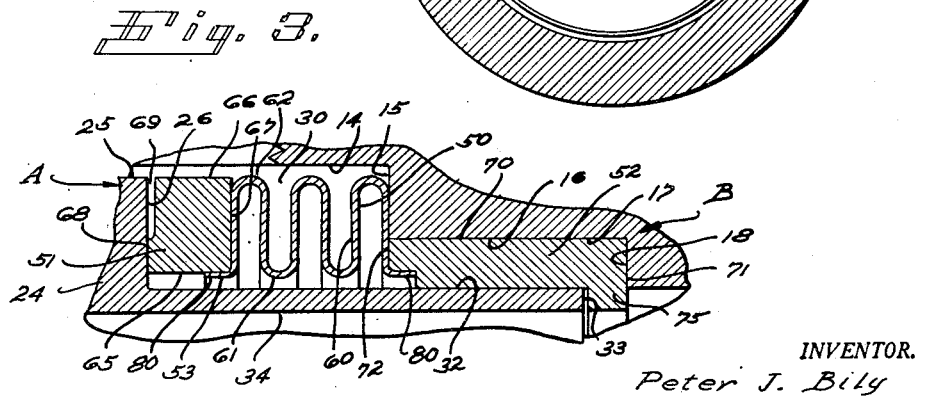

The various objects and features of my invention will be fully understood from the following detailed description of a typical preferred form and application of the invention, throughout which description reference is made to the accompanying drawings, in which:

Fig. 1 is a perspective view of a typical swivel connection or joint shown applied to aligned conduits or pipes, a portion of the structure being broken away to illustrate the details thereof. Fig. 2 is an enlarged detailed transverse sectional view taken in the general direction indicated by line 2—2 on Fig. 1, and Fig. 3 is an enlarged detailed sectional view taken as indicated by line 3—3 on Fig. 2.

The structure provided by the present invention is applicable to swivel joints or swivel connections, generally. For purpose of illustration it is shown applied to a typical or simple form of swivel connection involving two male and female sections or members A and B coupled for relative rotation by a suitable means C.

The joint section B is a female section tubular in form preferably a simple straight open ended element and it is constructed at its outer end 10 to receive or make connection with a pipe 11, or the like. In the particular case illustrated threads 12 connect the portion 10 of section B and the pipe 11. The inner end portion 13 of the section B is enlarged somewhat and is provided with a socket 14 which enters from the inner end of the section and which terminates at a shoulder 15 at the inner end of the socket. The socket is concentric with the section and the shoulder 15 at the inner end of the socket is a flat shoulder in a plane normal to the longitudinal axis of the structure. A counterbore 16 continues in the section B from the shoulder 15 and has a cylindrical wall 17 concentric with the socket. The counterbore terminates at a bottom 18 which is flat and normal to the longitudinal axis of the structure. The cylindrical wall 17 of the counterbore is considerably smaller in diameter than the cylindrical wall of the socket 14 and the counterbore extends a substantial distance axially in the section B from the shoulder 15, as will be apparent from the drawings.

The joint section A is a male section tubular in form and is preferably a simple straight open ended element having an outer end portion 20 that receives and makes connection with a pipe 21, or the like. In the case illustrated threads 23 are shown connecting the pipe 21 and the end portion 20 of section A. The section A has a central opening 36 defining a flow passage round in cross sectional configuration and of substantially the same size and shape of the fluid carrying opening established by the female section and it is aligned therewith.

The inner end portion 24 of section A extends into the socket 14 of section B and terminates therein. The exterior 25 of the portion 24 is round or cylindrically curved and fits in the socket 14 with working clearance. The portion 24 of section A has a flat terminal end 26 in a plane normal to the longitudinal axis of the structure and opposed to the shoulder 15 of the socket 14. The end 26 and the shoulder 15 are spaced a substantial distance apart axially of the joint and to establish a chamber 30 in the structure formed by the sections A and B, as clearly shown in Fig. 3 of the drawings.

An extension 31 of the end portion 24 continues or projects from the end 26 of portion 24 and has an outer cylindrical wall 32 concentric with and spaced a substantial distance inwardly from the cylindrical wall 17 of the counterbore 16. The extension has an end 33 terminating in the counterbore 16 and spaced axially from an opening the bottom 18 of the counterbore. In the preferred construction, as shown in the drawings, the inner wall 34 of the extension 31 is cylindrically curved and is of the same size and shape as the flow passage or opening 36 through section A.

From the foregoing description it will be apparent that the sections A and B, when together, as illustrated in Fig. 1 of the drawings, define a chamber 30 of substantial size having an axial extension formed by the counterbore 16, which chamber and extension are enclosed by the tubular extension 31 projecting from the inner end of section A.

The means C coupling the section A and B for relative rotation is shown as an anti-friction bearing means involving an annular series of balls 40 in registering grooves 41 in the sections A and B. The enlarged portion 13 of section B is shown provided with an access opening 41 through which the balls may be passed into and out of position between the sections A and B. The opening 41 is normally closed by a suitable closure or plug 42 which may carry a suitable lubricant fitting 43. It is important to note that anti-friction bearing means is in the socket and is located therein outward of the chamber 30.

The present invention provides, generally, a packing means in the structure formed by the sections A and B and this means is preferably in the form of a packing unit carried in the chamber 30 and the extension thereof formed by the counterbore 16. In the preferred form of the invention illustrated in the drawings the packing means or packing unit involves, generally, a tubular bellows 50, a sealing ring 51 at one end of the bellows, and a sealing sleeve 52 at the other end of the bellows and means 53 connecting the ends of the bellows to the ring and sleeve.

The bellows 50 is a resilient collapsible or conformable member under compression axially of the joint. The bellows is an annular or tubular element, preferably formed of thin walled resilient material such as a suitable metal. Resilience is gained in the bellows 50 by the construction or formation of the bellows which involves generally a plurality of flat, disc-like parts, annular in form and joined by inner and outer curved connecting parts 61 and 62, respectively, so that the bellows is corrugated or a zig-zag construction, as clearly shown in Fig. 3 of the drawings. It will be apparent that by use of suitable resilient material or metal of the proper gauge and by suitably proportioning the portions or elements of the bellows 50, a bellows may be established having the desired resilience or compression characteristics so that the ring 51 is maintained in the desired sealing engagement with the end 26 of the section A, as will be hereinafter described. The outside diameter of the bellows is substantially the same as that of the portion of the male element entered in the socket and its inside diameter is such that it receives the extension 31 with working clearance.

The ring 51 is a sealing ring carried by one end of the bellows and cooperating with the end 26 of section A to have the desired sliding sealing engagement therewith. In the particular case illustrated the ring 51 has an inner peripheral wall 65 concentric with the sealing unit and engaged around the extension 31 with substantial clearance, an outer peripheral wall 66 concentric with the sealing unit and clear of the wall of socket 14, a flat end wall 67 engaged by one end of the bellows and a stepped end wall opposing the end 26 and having a narrow or limited step 68 contacting the end 26. The narrow or limited step 68 of the sealing ring which engages the end 26 adjoins the inner peripheral wall 65 so that the balance of the ring is spaced from the end 26 by an opening or space 69. The end 67 of the ring 51 is flat and forms a seat supporting an endmost disc 60 of the bellows.

The sleeve 52 is an elongate annular or tubular part occupying the counterbore 16 in section B. The outer cylindrical surface 70 of a sleeve 52 fits the cylindrical wall 17 of the counterbore. This fit is preferably such that the sleeve 52 is tight in the counterbore. One end 71 of the sleeve is flat and seats against the bottom 18 of the counterbore while the other end 72 of the sleeve is flat and is preferably flush with the shoulder 15 occurring where the socket 14 terminates. An end disc 60 of the bellows 50 engages or seats on the end 72 of sleeve 52 and continues radially outward to seat on or bear against the shoulder 15, as clearly shown in Fig. 3 of the drawings. The sleeve 52 is provided at its end remote from the bellows with a flange 75. Flange 75 adjoins the end 71 and projects radially inward between the bottom 18 and the end 33 of extension 31. The extension 31 has its outer cylindrical wall fitted in the sleeve so the extension is free to rotate in the sleeve while the sleeve forms an effective bearing means mounting the parts in proper alignment. This bearing means is spaced a substantial distance axially of the joint from the bearing means C. Through the arrangement provided this bearing means C is located in the female section outward of the packing or ring 51 and bellows member 50, while the bearing formed by sleeve 52 is disposed inwardly thereof.

The means 53 provided for connecting the ring 51 with bellows is shown as including an axially projecting flange 80 projecting from the disc 60 of the bellows which seats against the end 67 of the ring 51. Flange 80 fits tightly into the ring to have tight engagement with the ring, as shown in Fig. 3 of the drawings. The connection between the bellows 50 and the sleeve 52 corresponds to the construction just described in that the disc 60 of the bellows, which bears against the end of the sleeve, carries an axial flange 80 which seats or fits tightly into the sleeve 52. In the particular case illustrated the end of the sleeve 52 receiving the flange 80 is slightly counterbored. It will be apparent that by tightly fitting the flange 80 into the ring and sleeve a unit is established formed of the bellows 50, the ring 51 and the sleeve 52. If desired the flanges 80 may be bonded or joined to the ring and the sleeve to insure against leakage, as by welding, soldering, or the application of any suitable material that will prevent leakage between the parts at this point in the structure.

In the form of the invention illustrated a lubricant retainer 90 is provided between the sections A and B, for instance, in the exterior of section A, to engage in the socket 14 outward of the means C.

With the sealing unit provided by the present invention in place between the sections A and B under suitable compression, the sealing ring 51 is maintained in sealing engagement with the end 26 of section A, while the sleeve 52 is carried in the counterbore 16 and may have suitable bearing engagement therein. As the joint sections A and B operate or turn relative to each other the sealing unit of the present invention may work or operate relative to either of the sections. The sealing unit is highly efficient and effective and maintains a fluid tight seal between the sections A and B even though there may be some play or looseness between the sections, either radially or axially, or both. With the seal of the present invention it is practical to employ a simple, inexpensive coupling means C such as a single row of balls between the male and female sections, since limited play or working between the sections is not fatal to proper operation as in the case with most packing constructions.

Having described only a typical preferred form and application of my invention, I do not wish to be limited or restricted to the specific details herein set forth, but wish to reserve to myself any variations or modifications that may appear to those skilled in the art and fall within the scope of the following claim:

Having described my invention, I claim:

A sealed swivel joint for fluids comprising a female member having a socket terminating at its inner end in an annular transverse shoulder and a counterbore communicating with said socket and terminating at its inner end in a flat annular shoulder, a male member rotatably housed within said female member and having a flat annular shoulder setting off a tubular end extension of reduced diameter on said male member, anti-friction ball bearing means disposed in said socket between said male and female members, and a sealing unit disposed between said male and female members, said unit including a sealing ring having bearing engagement at its outer end against said flat annular shoulder of said male member and a sealing sleeve rigid in said counterbore of said female member and having bearing engagement at its inner surface against the outer surface of said tubular end extension of said male member, the inner end of said sleeve abutting against said annular shoulder of said counterbore of the female member, said sealing unit further including a resilient tubular bellows member having its inner end abutting against said annular transverse shoulder of said female member and secured to the outer end of said sealing sleeve, the outer end of said bellows member being secured to and abutting against the inner end of said sealing ring, whereby said sealing unit is fast on said female member for rotation therewith relative to said annular shoulder on said male member and said end extension of said male member.

References Cited in the file of this patent

UNITED STATES PATENTS

| | | |
|---|---|---|
| 1,487,567 | Hill | Mar. 18, 1924 |
| 1,535,219 | Fulton | Apr. 28, 1925 |
| 2,252,642 | Popper | Aug. 12, 1941 |
| 2,381,432 | Bratton | Aug. 7, 1945 |
| 2,444,868 | Allen et al. | July 6, 1948 |
| 2,549,951 | Warren | Apr. 24, 1951 |

FOREIGN PATENTS

| | | |
|---|---|---|
| 333,419 | Great Britain | Apr. 14, 1930 |
| 246,520 | Switzerland | Oct. 5, 1945 |